Patented Jan. 16, 1934

1,943,633

UNITED STATES PATENT OFFICE 1,943,633

PROCESS OF PREPARING ENZYMES

George Sperti, Covington, Ky., assignor to General Development Laboratories, Inc., New York, N. Y., a corporation of Delaware No Drawing. Application January 8, 1931
Serial No. 507,532

4 Claims. (Cl. 99—11)

This invention relates to a process for producing enzymes free from molds, bacteria and the like.

It is known that certain enzymes such as diastase can be produced from cereals. For example, cereal grain such as barley may be soaked in water and allowed to germinate. Shortly after germination has begun, the grain is dried, ground and percolated to extract the enzyme. However, even when the most careful sterilization procedure is followed, bacteria gain entrance and grow very rapidly, so that the enzyme is contaminated with bacterial growths.

One of the objects of the present invention is to provide a process for producing an enzyme free of bacteria.

Another object is to provide a process for stimulating the growth of enzyme-producing grain and the like while killing and preventing the growth of bacteria.

A further object is to provide a process of killing and preventing growth of bacteria and the like in enzyme-producing plants without injury to the plant itself.

In United States Patent No. 1,676,579 dated July 10, 1928, the discovery is announced that there is a critical wave length at which biological as well as other reactions caused by light begins, and that these reactions continue for all shorter wave lengths where absorption takes place. In accordance with this discovery, it has been found that wave lengths from 2850 to 2900 Angstrom units and longer are not harmful but beneficial to plants such as cereals. Bacteria are however killed at 2900 Angstrom units and below, while the enzyme itself is not harmed until shorter wave lengths of around 2700 to 2750 Angstrom units are reached.

Accordingly grain may be sprouted under irradiation with ultra-violet light and its growth stimulated, while at the same time bacterial growth is prevented, if no wave lengths shorter than about 2850 to 2900 Angstrom are employed. These wave lengths have substantial bactericidal action, the extent depending on the intensity of the source, the distance of the grain from the source, etc. The stimulating effect observed will also vary with the same factors. No harm, however, will be done to the enzymes produced.

The exclusion of the shorter wave lengths may be accomplished in any suitable manner. Various filter media are known, both liquid and dry, which do not transmit substantially below the desired limits. For example, a two and one-half percent solution of copper sulphate in distilled water does not transmit appreciably below 2890 Angstrom units. Instead of filtering, a light source may be selected which does not emit below the desired limit.

The stimulation of germination and growth of the grain reduces the time necessary for sprouting and aids in the production of the enzyme. At the same time bacteria and molds are killed by exposure to the lethal waves of the light. Whether or nor complete sterilization takes place, which will depend on the conditions of irradiation, bacterial growth will be prevented.

The process may be applied to the production of sterile enzymes of any sort which are extracted from or produced by plant growths to which light waves lethal to bacteria are not injurious, since in general the critical wave lengths at which different enzymes are destroyed will be in the region below 2900 Angstrom units. These critical wave lengths may however vary. For example, invertase begins to be destroyed at about 2480 Angstrom units, pepsin at about 2370 Angstrom units, etc. These points may readily be verified and others established by test.

Enzymes produced according to the above process are substantially sterile and when used in foods or industrial processes do not result in contamination with bacteria and molds. Bread, for example, when baked with the diastatic enzyme described without sterilization, molds in one or two days and is unfit for consumption. Heat processes are unsuitable for sterilizing because they destroy the enzyme as well as the bacteria. When treated according to the process described above, objectionable contamination of the bread does not occur. Similar advantages are realized in connection with other industrial processes and in connection with other enzymes.

What is claimed is:

1. A process for producing a sterile enzyme which consists in irradiating growing enzyme-producing cereal plants with ultro-violet light to kill bacteria and the like while excluding from the light wave lengths short enough to cause injury to the plants and extracting the enzyme from said plants.

2. A process for producing sterile enzymes which consists in sprouting enzyme-producing plants under irradiation with ultra-violet light containing wave lengths lethal to bacteria and molds but excluding wave lengths harmful to said plants and extracting the enzyme from said plants.

3. A process for producing sterile enzymes which consists in irradiating growing enzyme-producing cereal plants with ultra-violet light containing substantially no wave lengths shorter than 2850 to 2900 Angstrom units and extracting the enzyme from said plants.

4. A process for producing sterile enzymes which consists in sprouting enzyme-producing cereals under ultra-violet light containing substantially no wave lengths shorter than about 2850 to 2900 Angstrom units and extracting the enzyme from said cereals.

GEORGE SPERTI.